Sept. 24, 1968 P. PEROLO 3,402,738
PIPE COUPLING WITH VALVES
Filed Oct. 14, 1965 5 Sheets-Sheet 1

INVENTOR:
PIERRE PEROLO
BY Kurt Kelman
AGENT

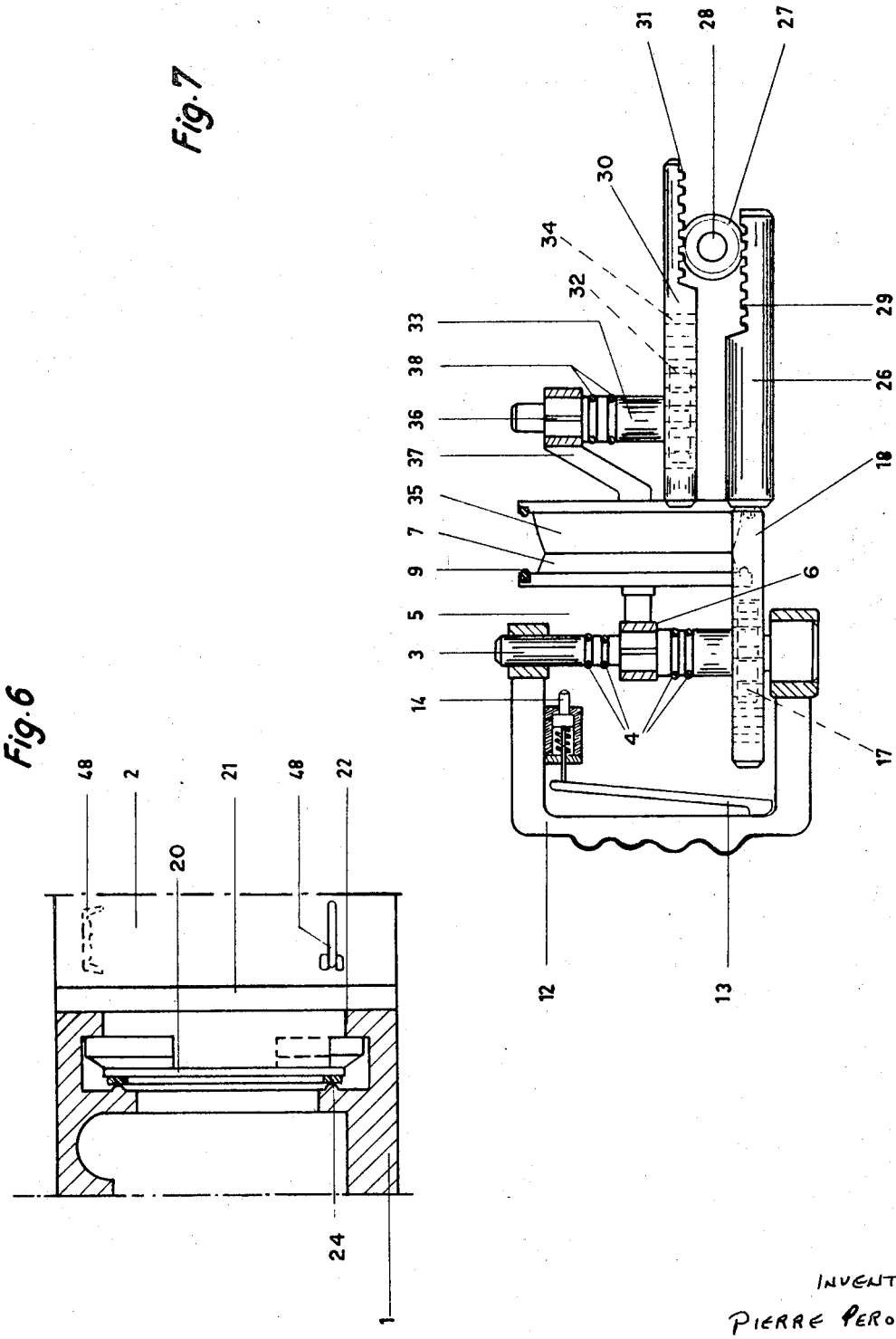

United States Patent Office 3,402,738
Patented Sept. 24, 1968

3,402,738
PIPE COUPLING WITH VALVES
Pierre Perolo, Blaye, Gironde, France, assignor to Etablissements J. Perolo & Cie, S.A., Blaye, France, a French company
Filed Oct. 14, 1965, Ser. No. 496,006
Claims priority, application France, Oct. 15, 1964, 991,473
5 Claims. (Cl. 137—614.06)

ABSTRACT OF THE DISCLOSURE

The two tubular elements of a pipe coupling are each equipped with a flap valve spring-biased toward the closed position and opened by a rack and pinion. A bayonet-type coupling connects the elements which are angularly secured by the rack of each element projecting into a recess of the other element when the valves are open. One valve is manually opened and its rack abuttingly engages an auxiliary rack of the other element in the recess of the latter, whereby the valves move in unison.

---

The present invention relates to a coupling of two pipe elements, which may be rigid or flexible. Valve means is provided for closing the open ends of the two pipe elements so that they may be coupled and uncoupled without fluid in the pipe elements leaking out of, or air leaking into, the elements.

The pipe elements may be coupled or uncoupled while a liquid of gaseous fluid, or a fluidized stream of particulate material passes through the piping under or without pressure, the valve means being manually operable in unison.

In accordance with the present invention, the coupling comprises a pair of mating tubular elements which have means for effecting coupling thereof by a turning movement of one element relative to the other and along their axis. Each coupling element has a hinged flap valve adapted to open and close one end of its respective element. The actuation means for one flap valve comprises a first rack and a first pinion engaging the first rack, and an actuating lever therefor extending from the one coupling element. A portion of the first rack is arranged to slide into a recess in the other coupling element upon actuation of the one flap valve so as to lock the coupling elements against relative rotation. Means associated with the recess is arranged to be contacted and moved upon actuation of the first rack for actuating the other flap valve, the last mentioned means comprising a second rack and a second pinion engaging the second rack.

According to one feature of this invention, respective terminal portions of the tubular elements and the valves enclose a space therebetween when the valves are closed and the elements are coupled. An auxiliary valve is mounted in one of the flap valves, and means is provided for opening the auxiliary valve while the one flap valve is closed.

This allows the opening of these flap-valves without a manual effort on the actuating lever, whatever the pressure may be in the element receiving the fluid. It is to be noted that this device may operate when the fluid flows in one or another direction or in both directions, the valve actuation being selected accordingly.

The present invention will be more fully understood from the following description of a preferred embodiment taken in conjunction with the accompanying drawings in which:

FIGURE 6 shows a partial sectional view of the uncoupled elements of FIGURE 4 being coupled.

FIGURE 7 shows the valve opening mechanism in closed position.

Figure 1:
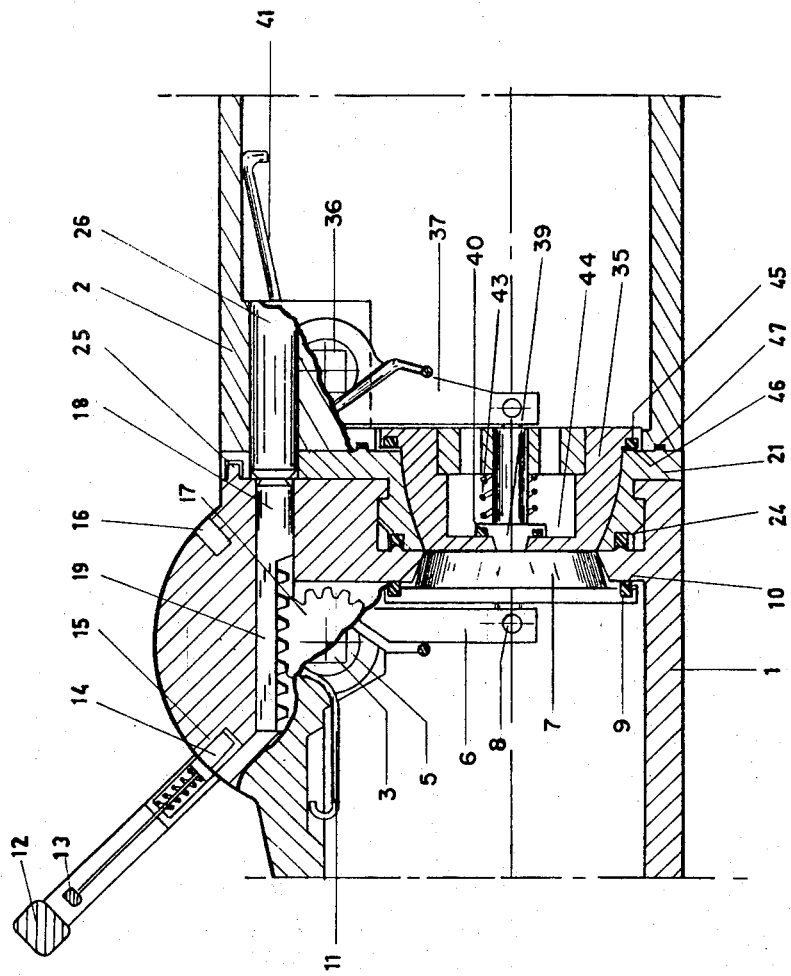
FIGURE 1 shows, in cross-sectional view, the whole coupling with closed valves.
Figure 2:
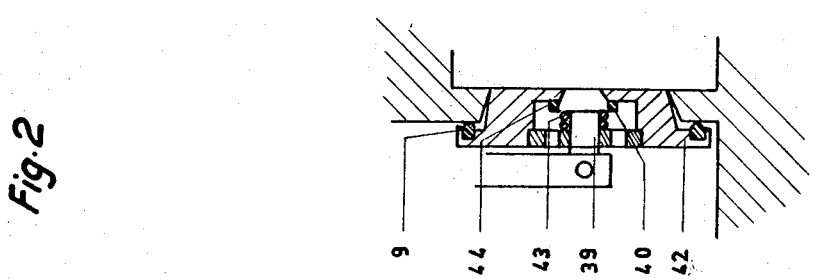
FIGURE 2 shows a detail of the valve arrangement.
Figure 3:
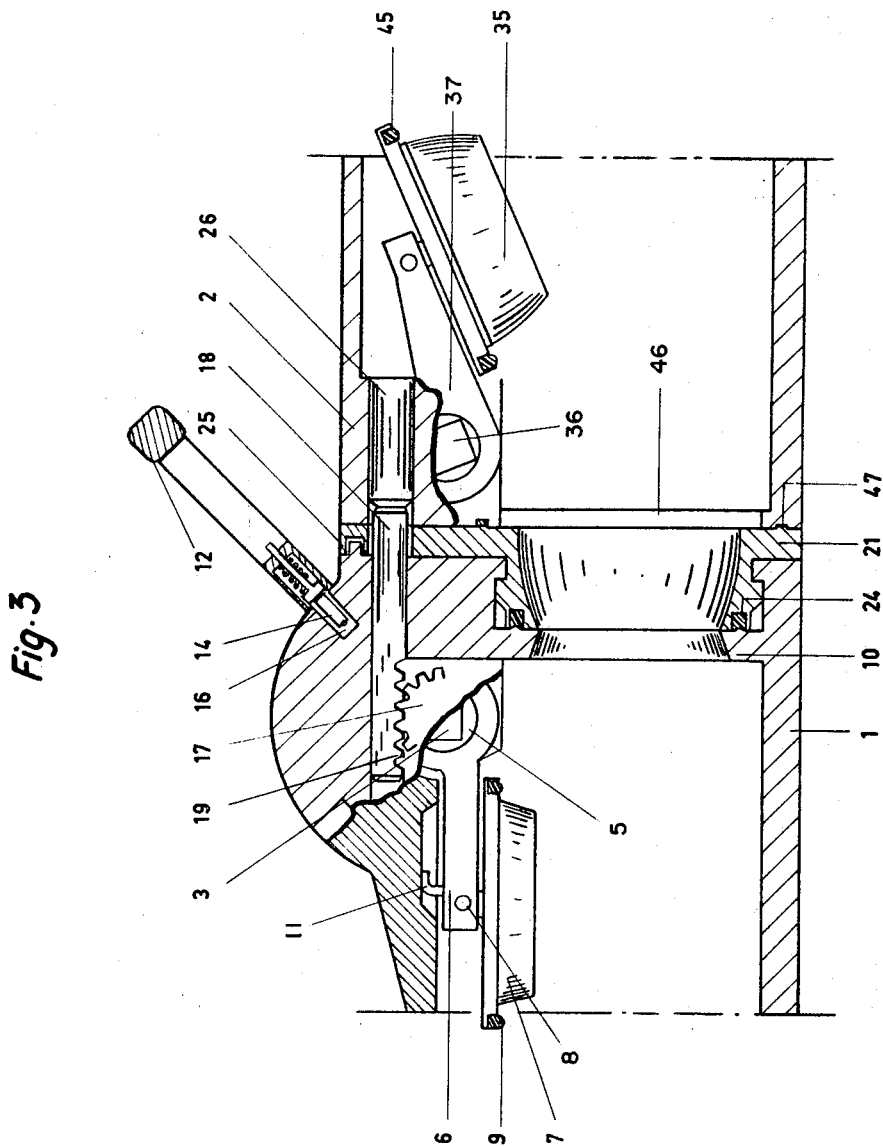
FIGURE 3 shows, in cross-sectional view, the whole coupling with the opened valves.
Figure 4:
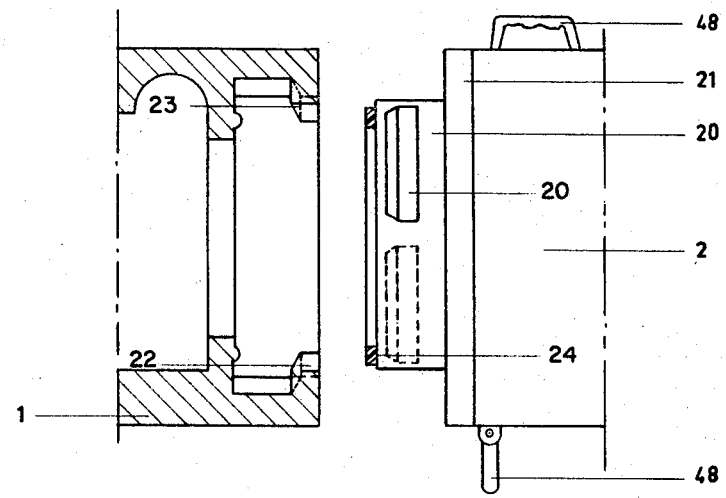
FIGURE 4 shows a partial sectional view of the uncoupled elements of the device.
Figure 5:
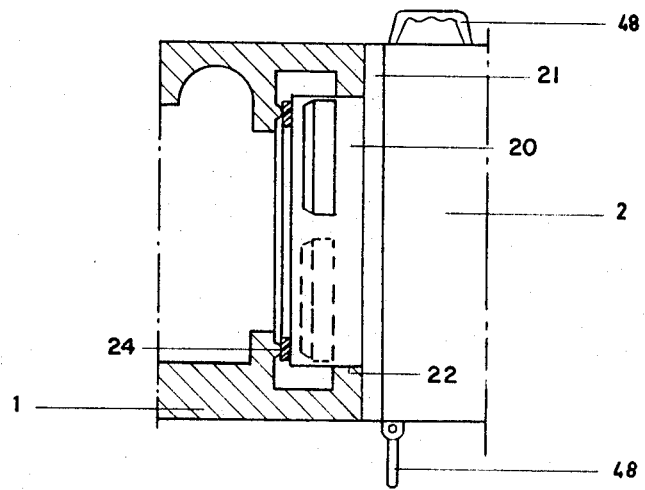
FIGURE 5 shows a partial sectional view of the uncoupled elements of FIGURE 4 in the first stage of coupling.
Figure 8:
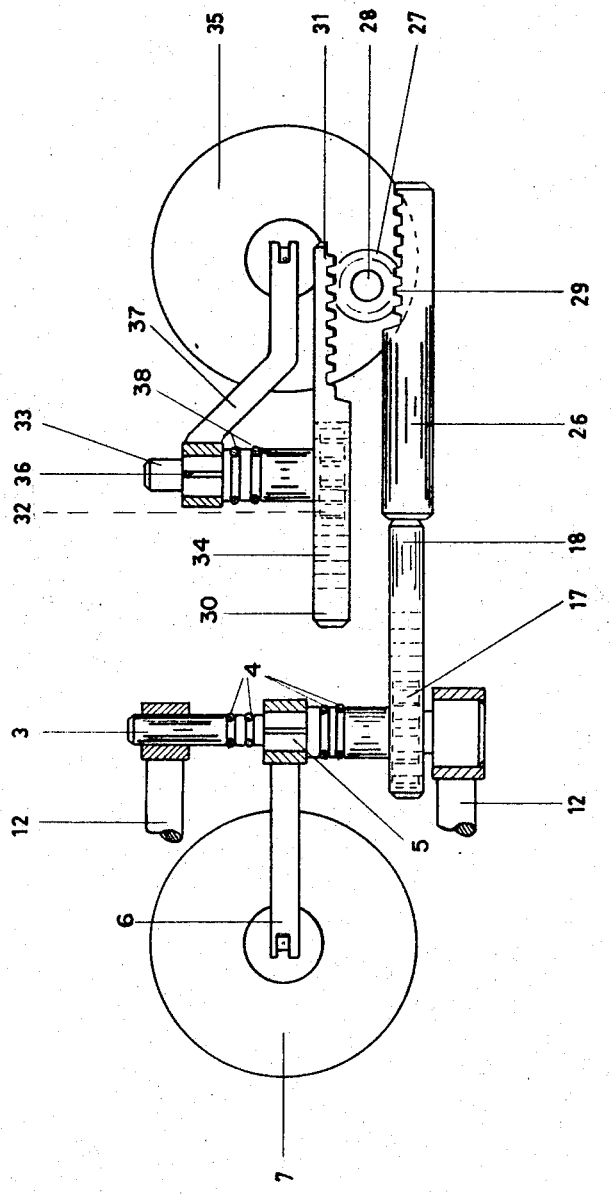
FIGURE 8 shows the opening mechanism in opened position.

Referring to the drawing, it will be noted that the device consists essentially of two tubular coupling elements 1 and 2 in the first of which a shaft 3 rotates in a bore provided for this purpose in the coupling element 1. This shaft 3 is fitted with one or several O rings 4 the purpose of which is to seal the interior of the element 1 from the outside, and, particularly, from the several mechanical elements of the device. A square portion 5 of the shaft 3 carries a connecting-rod 6 on which a flap-valve 7 is mounted.

The connecting-rod 6 and the flap-valve 7 are connected by a pin 8. The flap-valve 7 is fitted with a sealing ring 9 and, to close the first part of the device, is pressed against the valve seat 10 of element 1 by a spring 11.

The valve 7 is actuated by lever 12 which is fitted with a mechanism 13, which retracts a spring-loaded finger 14. The finger enters a hole 15 of element 1 to hold the valve 7 in the closed position, or a hole 16 of element 1 to maintain the flap-valve 7 in opening position.

The shaft 3 is fitted with a pinion 17 which, during movement of flap-valve 7, transmits a longitudinal movement to a pusher rod 18, which has a rack 19.

The parts of the coupling are engaged by fitting a spigot 20 of the end 21 of element 2 axially into the bore 22 of element 1.

By rotating one of the elements by a quarter of a turn, helicoidal projections 23 of the end 21 draw element 1 against element 2. A sealing ring 24 makes the internal circuit air-tight. A stop 25 limits the turning movement and causes the alignment of pusher rod 18 with an auxiliary pusher rod 26 on the element 2. Thus, when the coupling is made, the longitudinal movement of pusher rod 18 during the opening of flap-valve 7 is transmitted to auxiliary pusher rod 26 which will cause the rotation of a pinion 27 on a shaft 28 by means of a rack 29. The pinion 27 transmits in turn a longitudinal movement to pusher rod 30 through its part 31 cut as a rack. This longitudinal movement is transmitted to pinion 32 integral with a shaft 33 through another part of pusher rod 30 cut as a rack 34.

The flap-valve 35, contained in element 2, opens thus simultaneously and symmetrically with flap-valve 7 contained in element 1, because a square portion 36 of the shaft 33 carries the connecting-rod 37 of the valve 35. This flap-valve 35 is fitted with a sealing ring 45 which bears on the face 46 of the end 21.

The shaft 33 rotates in a bore provided in element 2 and is fitted with one of several O rings 38 for sealing the inside of element 2 from the outside and, particularly, for isolating the mechanical elements from the channeled fluid.

Flap-valve 35 is fitted with an auxiliary valve 39 which permits the opening of the hinged flap-valves if the connection works in a high pressure system when lever 12 is operated, while the two elements are coupled together, the hinged flap-valve 7 opens and, through the previously described mechanism, the seal 40 of the auxiliary valve 39 is lifted from the bearing face 44 of the flap-valve 35, whereby the space between the flap-valve 7 and the flap-valve 35 rapidly reaches pressure balance and allows the opening of these flap-valves without any manual effort on the lever 12, regardless of the pressure in element 2.

The closing of flap-valve 35 is insured by a spring 41, if the finger 14 is taken away from hole 16 on element 1, when both parts are coupled.

In the above-described case, the direction of flow is from element 2 to element 1. In order that the hinged flap-valve connection operates in the other direction, or in both directions, and with high pressures, valve 7 would be replaced by valve 42 fitted in the same way as auxiliary valve 35 (valve 39, seal 40, spring 43).

When lever 12 does not actuate the opening of the hinged flap-valves, a spring 43 holds the valve 39 of the flap-valve 35 closed and, optionally, according to the selected flow directions, valve 39 in flap-valve 42, by applying their respective seals 40 to the faces 44 of flap-valves 42 and 35, the action of springs 11 and 41 makes good the closing of these valves 39 and also insures the closing of flap-valves 35 and 42 by applying their respective seals 9 and 45 on the faces 10 of element 1 and 46 of end 21.

The end 21 is fixed on element 2 and this connection is made air-tight by a seal 47.

After coupling elements 1 and 2, and if the flap-valves 7 and 35 are to be opened, pusher rod 18 of element 1 enters the bore of auxiliary pusher rod 26 in element 2 and, in the same manner, pusher rod 30 is placed in a suitable recess on element 1. Thus, these pusher rods act as bolts and prevent the uncoupling of the two elements. This uncoupling will be only possible if both flap-valves are returned to their initial location, e.g. the closed position.

It is to be noted that, if only one of both flap-valves closes, the two elements cannot be disassembled, the pusher rod associated with the open flap-valve remaining engaged in the recess of the opposite coupling element.

To facilitate the coupling of the parts, one or both elements may be fitted with handles 48.

I claim:

1. A coupling comprising a pair of mating tubular elements having means for effecting coupling thereof by a circular movement of one element relative to the other and along their axis, each coupling element having a hinged flap valve adapted to open and close one end of its respective coupling element, actuation means for one of the flap valves comprising a first rack and a first pinion engaging said first rack, and an actuating lever therefor extending from said one coupling member, a portion of said rack being arranged to slide into a recess in said other coupling element upon actuation of said one flap valve so as to lock said coupling elements against relative rotation, means associated with said recess arranged to be contacted and moved upon actuation of said rack for actuating the other flap valve, said last mentioned means comprising a second rack and a second pinion engaging said second rack.

2. A coupling as set forth in claim 1, wherein respective terminal portions of said elements and said valves enclose a space therebetween when said valves are closed and said elements are coupled, further comprising an auxiliary valve in one of said flap valves and means for opening said auxiliary valve while said one flap valve is closed.

3. A coupling as set forth in claim 1, wherein said means associated with said recess include an auxiliary rack meshingly engaging said second pinion for rotating the same and for thereby displacing said second rack, the latter projecting from said other element into a recess of said one element when said other flap valve is open.

4. A coupling as set forth in claim 3, wherein said portion of said first rack is located in said recess of said other element when the valve of said one element is in the open position, said first rack when sliding into said recess abuttingly engaging said auxiliary rack and moving the same in a direction to open said other valve.

5. A coupling as set forth in claim 1, wherein each of said elements is formed with a bore, said bores constituting a channel for flow of fluid therethrough when said elements are coupled, the coupling further comprising means sealing said racks and pinions against contact with said fluid.

References Cited

UNITED STATES PATENTS 3,295,553   1/1967   Garrett _____ 137—614.06

FOREIGN PATENTS 1,229,547   7/1962   France.

WILLIAM F. O'DEA, *Primary Examiner.*

H. COHN, *Assistant Examiner.*